(12) United States Patent
Watson et al.

(10) Patent No.: US 11,295,772 B1
(45) Date of Patent: Apr. 5, 2022

(54) DATA STORAGE DEVICE COMPENSATING FOR TAPE DISTORTION

(71) Applicant: Western Digital Technologies, Inc., San Jose, CA (US)

(72) Inventors: Mark L. Watson, Boulder, CO (US); Trevor W. Olson, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/180,803

(22) Filed: Feb. 21, 2021

Related U.S. Application Data

(60) Provisional application No. 63/113,845, filed on Nov. 14, 2020.

(51) Int. Cl.
| | | |
|---|---|---|
| *G11B 5/584* | (2006.01) | |
| *G11B 5/78* | (2006.01) | |
| *G11B 5/008* | (2006.01) | |
| *G11B 5/588* | (2006.01) | |

(52) U.S. Cl.
CPC .......... *G11B 5/584* (2013.01); *G11B 5/00813* (2013.01); *G11B 5/78* (2013.01); *G11B 5/588* (2013.01)

(58) Field of Classification Search
None
See application file for complete search history.

(56) References Cited

U.S. PATENT DOCUMENTS

| | | | | |
|---|---|---|---|---|
| 5,828,514 A | * | 10/1998 | Chliwnyj | G11B 33/10 360/77.12 |
| 5,946,156 A | | 8/1999 | Schwarz et al. | |
| 5,982,711 A | * | 11/1999 | Knowles | G11B 5/4893 360/53 |
| 6,101,060 A | * | 8/2000 | Wojciechowski | G11B 5/5927 360/70 |
| 6,690,535 B2 | * | 2/2004 | Wang | G11B 5/584 360/25 |
| 7,193,812 B2 | * | 3/2007 | Eaton | G11B 5/127 360/121 |
| 7,196,860 B2 | | 3/2007 | Alex | |
| 9,214,164 B2 | * | 12/2015 | Biskeborn | G11B 5/00813 |
| 11,120,831 B1 | * | 9/2021 | Watanabe | G11B 15/093 |
| 2005/0018349 A1 | | 1/2005 | Eaton | |
| 2006/0092547 A1 | * | 5/2006 | Kawakami | G11B 5/584 360/71 |
| 2009/0268599 A1 | | 10/2009 | Murakami | |

(Continued)

FOREIGN PATENT DOCUMENTS

| | | |
|---|---|---|
| KR | 20100125363 A | 11/2010 |
| KR | 20200021905 A | 3/2020 |

OTHER PUBLICATIONS

International Search Report and the Written Opinion for International Application No. PCT/US2021/038158 dated Oct. 8, 2021, 8 pages.

*Primary Examiner* — Tan X Dinh
(74) *Attorney, Agent, or Firm* — Patterson & Sheridan, LLP; Steven H. Versteeg

(57) ABSTRACT

A data storage device is disclosed comprising at least one head configured to access a magnetic tape. User data is written to a first area of the magnetic tape at a first data track pitch, and when a distortion of the magnetic tape is detected, the user data is rewritten to compensate for the distortion.

19 Claims, 9 Drawing Sheets

(56) References Cited

U.S. PATENT DOCUMENTS

2010/0226039 A1* 9/2010 Bui ................. G11B 5/584
                                                360/77.12
2014/0334033 A1* 11/2014 Biskeborn .......... G11B 5/00826
                                                360/76

* cited by examiner

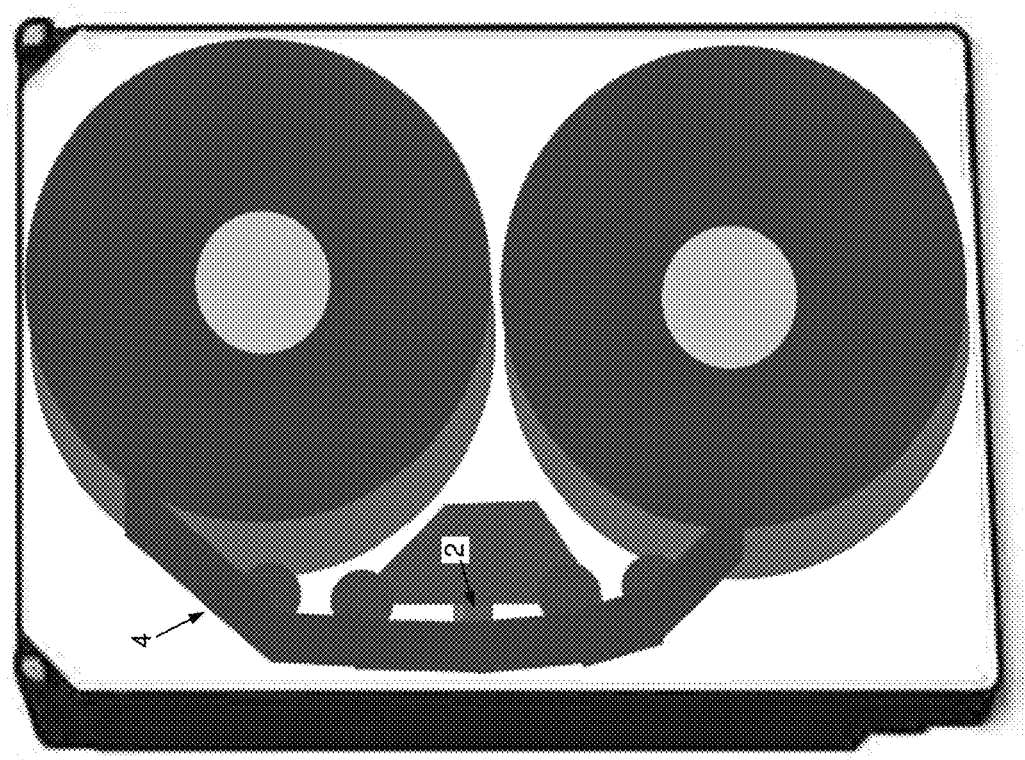
FIG. 1A
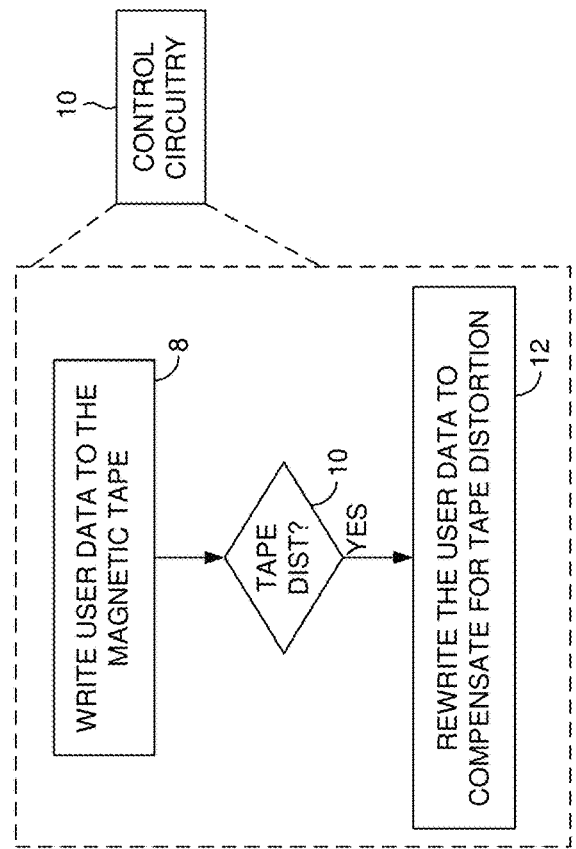
FIG. 1B
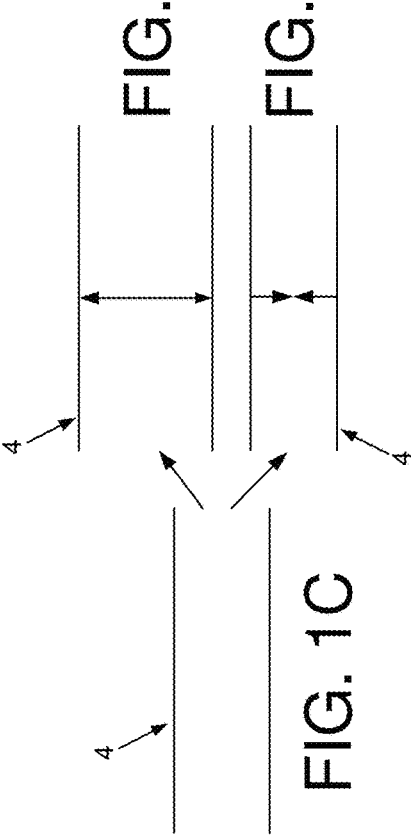
FIG. 1C
FIG. 1D
FIG. 1E

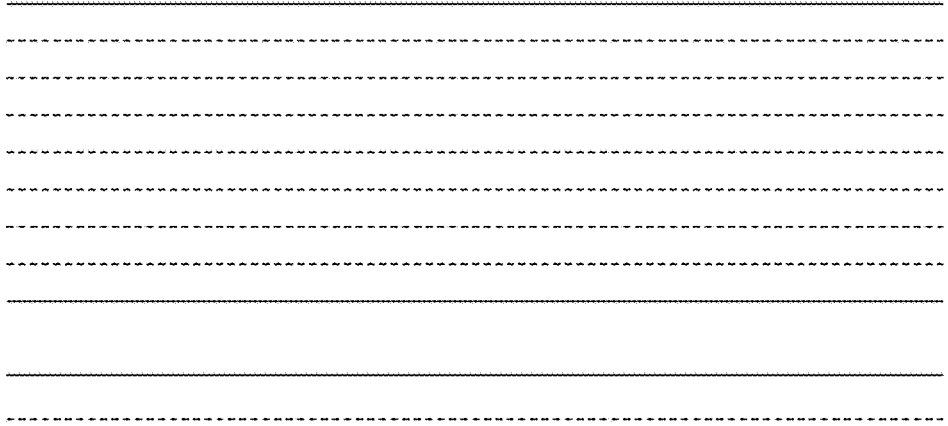
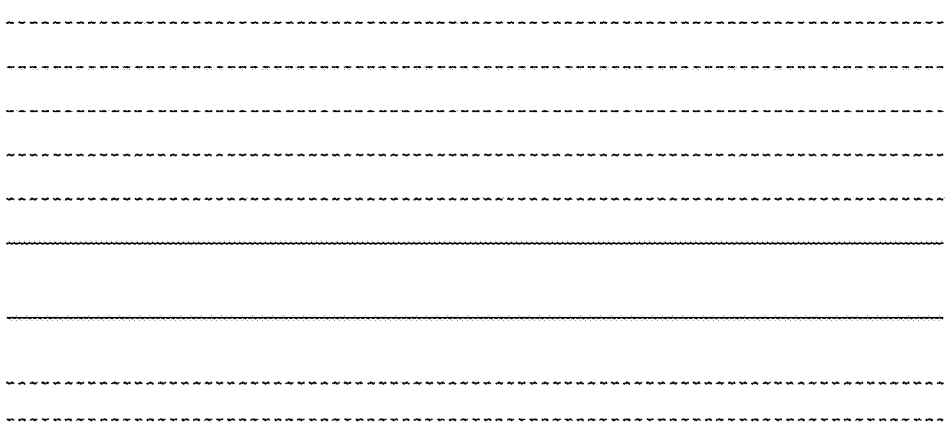
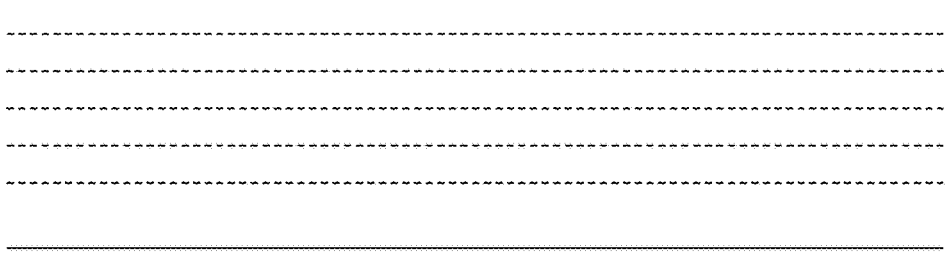

DATA STORAGE DEVICE COMPENSATING FOR TAPE DISTORTION

CROSS REFERENCE TO RELATED APPLICATIONS

This application claims priority to U.S. Provisional Patent Application Ser. No. 63/113,845, filed on Nov. 14, 2020, which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 1A shows a data storage device according to an embodiment comprising at least one head configured to access a magnetic tape.

FIG. 1B is a flow diagram according to an embodiment wherein when a distortion of the magnetic tape is detected, user data is rewritten to compensate for the distortion.

FIG. 1C shows an undistorted magnetic tape.

FIG. 1D shows an embodiment wherein the distortion comprises an expansion of the magnetic tape.

FIG. 1E shows an embodiment wherein the distortion comprises a contraction of the magnetic tape.

FIG. 3A shows an embodiment wherein data tracks are written to an undistorted area of the magnetic tape at a nominal data track pitch.

FIG. 3B shows an embodiment wherein the data track pitch of the previously written data tracks increases due to the magnetic tape expanding.

FIG. 3C shows an embodiment wherein the data tracks are rewritten at the nominal data track pitch to compensate for the expansion of the magnetic tape.

DETAILED DESCRIPTION

Figure 1F:
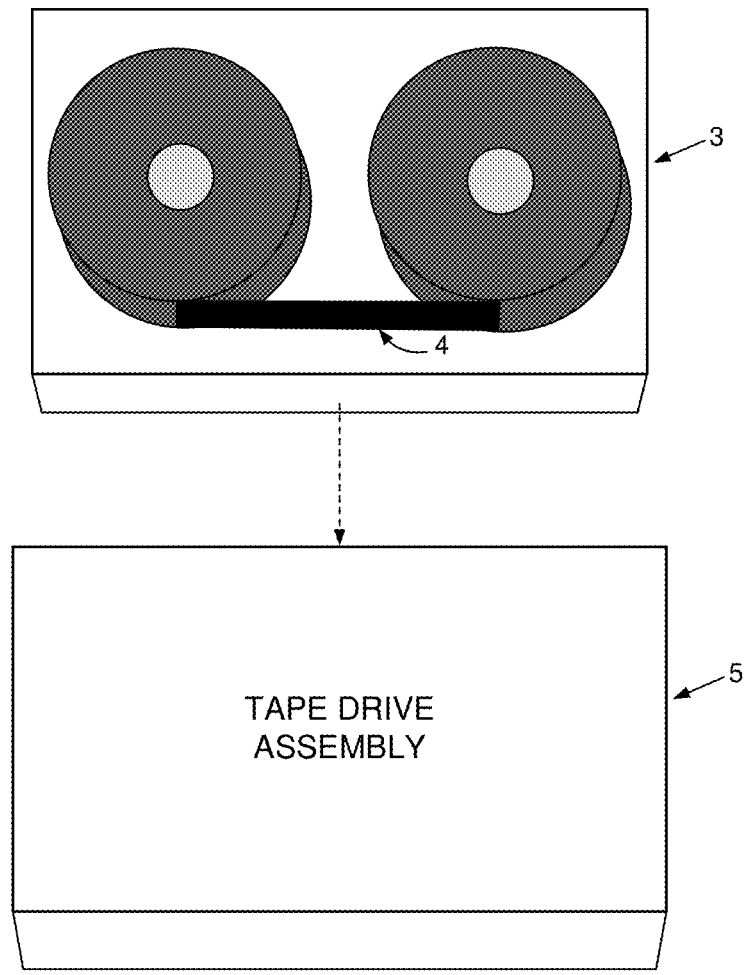
FIG. 1F shows a data storage device comprising a cartridge assembly comprising a magnetic tape, and a tape drive assembly configured to access the magnetic tape.

FIGS. 1A-1E show a data storage device according to an embodiment comprising at least one head 2 configured to access a magnetic tape 4, and control circuitry 6 configured to execute the flow diagram of FIG. 1B. User data is written to a first area of the first magnetic tape at a first data track pitch (block 8). When a distortion of the magnetic tape is detected (block 10), the user data is rewritten to compensate for the distortion (block 12). FIG. 1C shows an embodiment of an undistorted magnetic tape 4, whereas FIG. 1D shows an embodiment wherein a distortion is due to the magnetic tape 4 expanding, and FIG. 1E shows an embodiment wherein a distortion is due to the magnetic tape 4 contracting. The distortion of the magnetic tape 4 may be caused by changes in environmental conditions, such as changes in the ambient temperature and/or humidity, or changes in the fabrication layers of the magnetic tape which can occur due to aging and/or tape pack stress when wound around the reel during long storage intervals.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1F, the magnetic tape 4 may be housed in a cartridge assembly 3 that is inserted into (and ejected from) a tape drive assembly 5 similar to a conventional tape drive manufactured under the Linear Tape-Open (LTO)

standard. In one embodiment, the tape drive assembly 5 comprises the head 2 configured to access the magnetic tape 4, and the control circuitry 6 configured to execute the flow diagram of FIG. 1B.

Figure 2A:
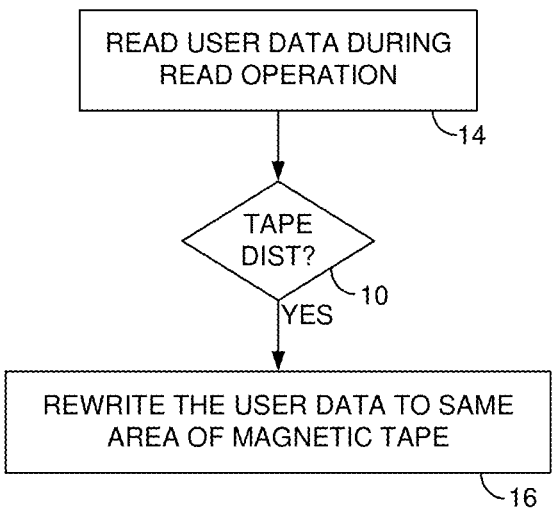
FIG. 2A is a flow diagram according to an embodiment wherein when distortion of the magnetic tape is detected, user data is rewritten to the same area of the magnetic tape.
Figure 2B:
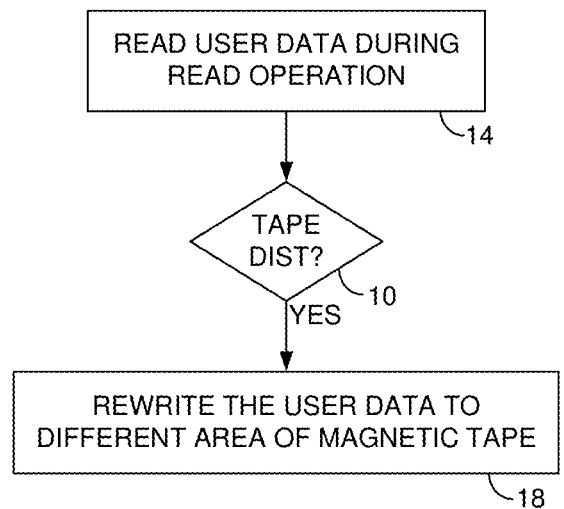
FIG. 2B is a flow diagram according to an embodiment wherein when distortion of the magnetic tape is detected, user data is rewritten to a different area of the magnetic tape.
Figure 2C:
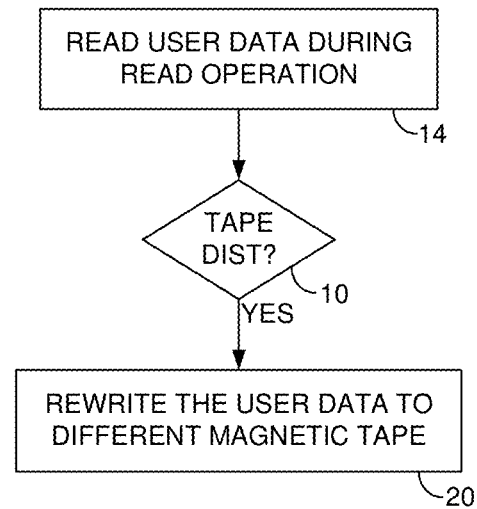
FIG. 2C is a flow diagram according to an embodiment wherein when distortion of the magnetic tape is detected, user data is rewritten to a different magnetic tape.

FIG. 2A is a flow diagram according to an embodiment wherein a distortion of the magnetic tape is detected (block 10) while reading the user data from the magnetic tape (block 14). For example, in one embodiment a distortion of the magnetic tape may be detected based on servo information read from the magnetic tape during the read operation, such as in an embodiment wherein the servo information is used to adjust a tilt angle of a head bar in order to align a plurality of heads with corresponding data tracks. In the embodiment of FIG. 2A, when the distortion is detected the user data is rewritten to the same area of the magnetic tape (block 16). In an alternative embodiment shown in the flow diagram of FIG. 2B, the user data may be rewritten to a different area of the magnetic tape (block 18), such as in a different data band of the same longitudinal segment or in a data band of a different longitudinal segment. In yet another embodiment shown in FIG. 3C, the user data may be written to a second, different magnetic tape (block 20), such as a second magnetic tape of the same data storage device or a different data storage device.

FIG. 3A shows an area of an undistorted magnetic tape having a plurality of data tracks (represented by dashed lines) written at a nominal data track pitch according to an embodiment. FIG. 3B shows the same area after the magnetic tape has expanded causing the data track pitch of the previously written data tracks to increase. In one embodiment, the increasing data track pitch due to the magnetic tape expanding may eventually prevent the concurrent access of the data tracks due to the data tracks exceeding the range of a plurality of heads configured to access the data tracks. Accordingly in one embodiment shown in FIG. 3C when the expansion of the magnetic tape is detected, the data tracks are rewritten (by rewriting with the old or new data) at the nominal data track pitch. That is, the data tracks shown in FIG. 3C are rewritten at the same data track pitch as the data tracks shown in FIG. 3A, thereby ensuring the data track pitch remains within a predetermined range.

Figure 4A:
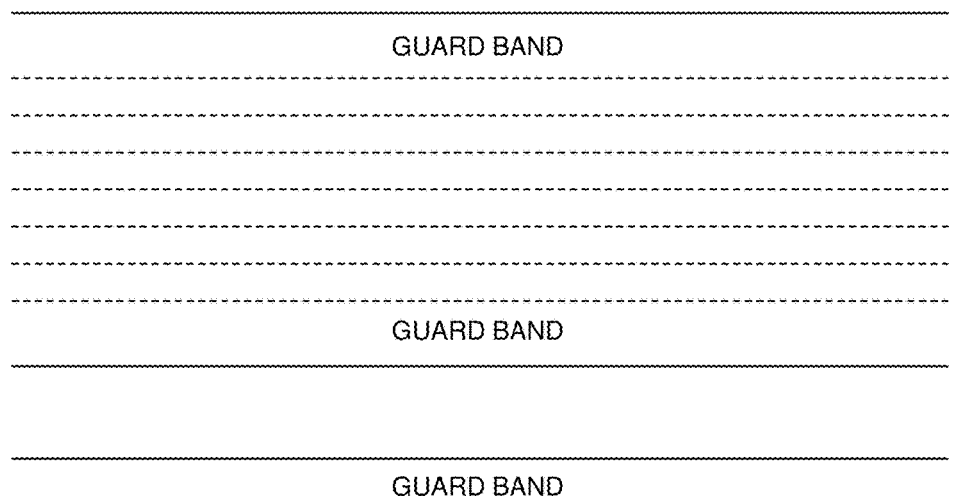
FIG. 4A shows an embodiment wherein data tracks are written to an undistorted area of the magnetic tape comprising at least one guard band.
Figure 4B:
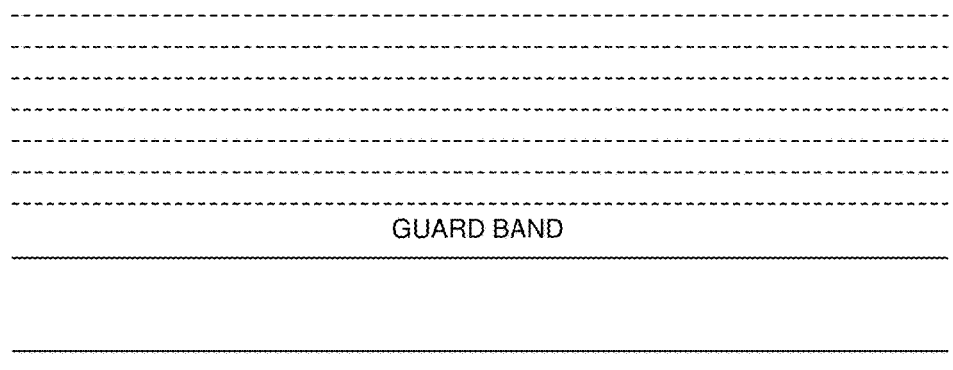
FIG. 4B shows an embodiment wherein the data track pitch of the previously written data tracks decreases due to the magnetic tape contracting.
Figure 4C:
FIG. 4C shows an embodiment wherein the data tracks are rewritten at the nominal data track pitch to compensate for the contraction of the magnetic tape.

FIG. 4A shows an embodiment wherein at least one guard band is defined at an outer boundary of a plurality of data tracks (e.g., a data band) when writing to an undistorted magnetic tape. This embodiment facilitates rewriting of the data tracks at the nominal data track pitch when a contraction of the magnetic tape exceeds a threshold (such as shown in FIG. 4B) which can cause excessive intertrack interference and/or prevent the concurrent access of the data tracks due to the decrease in the data rack pitch. In one embodiment when the data tracks are rewritten at the nominal data track pitch of FIG. 4A, the outer data tracks extend into the guard band(s) as shown in FIG. 4C. In one embodiment, the lateral width of the guard band(s) is defined to account for the worst case contraction of the magnetic tape over the life of the data storage device.

Figure 5A:
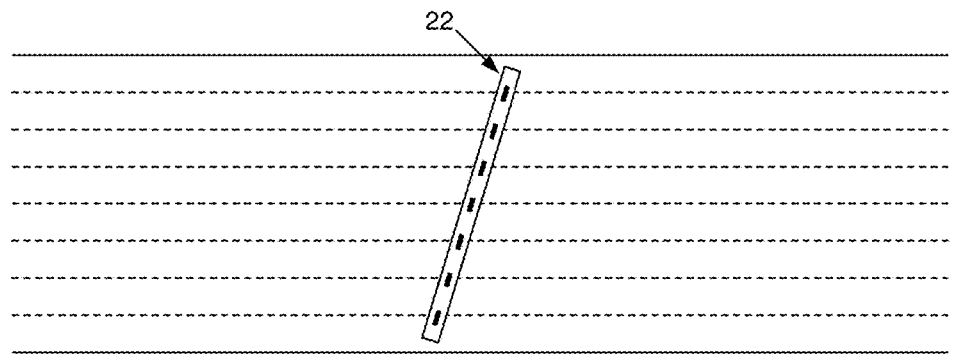
FIG. 5A shows an embodiment wherein a head bar is tilted at a nominal angle when writing data tracks at the nominal data track pitch to an undistorted area of the magnetic tape.
Figure 5B:
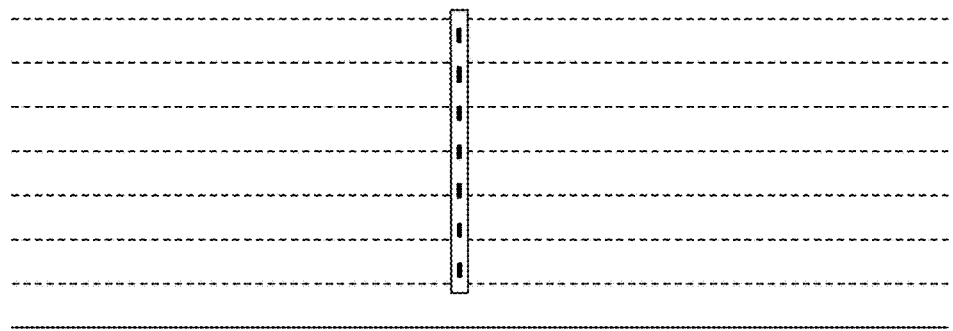
FIG. 5B shows an embodiment wherein an excessive expansion of the magnetic tape may prevent the head bar from accessing the data tracks due to the increase in the data track pitch.
Figure 5C:
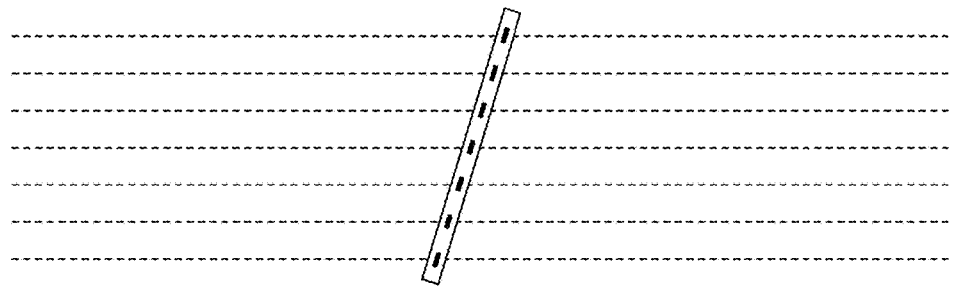
FIG. 5C shows an embodiment wherein when expansion of the magnetic tape is detected, the data tracks are rewritten at the nominal data track pitch by tilting the head bar at the nominal angle.

FIG. 5A shows an embodiment wherein the data storage device comprises a head bar 22 comprising a plurality of heads configured to access a plurality of data tracks, wherein each head may comprise at least one write element for writing a data track and at least one read element for reading the data track. In the embodiment of FIG. 5A, the head bar 22 is tilted at a nominal angle corresponding to a nominal data track pitch. During an access operation, the width of the magnetic tape may change due, for example, to variations in the tape tension. In addition to servoing the tape tension in order to help maintain a target tension and corresponding tape width, the angle of the head bar 22 may be servoed in order to help compensate for the varying data track pitch. In one embodiment, after writing a plurality of data tracks as shown in FIG. 5A the magnetic tape may expand over time due, for example, to changes in environmental conditions (temperature, humidity, etc.), tape aging, tape pack stress, etc. In one embodiment, the tape expansion such as shown in FIG. 5B may exceed the servo ability of the tape tension control and tilt angle control of the head bar 22. Accordingly in one embodiment, when the expansion of the magnetic tape exceeds a threshold, the data tracks shown in FIG. 5B are rewritten (with the old or new data) at the nominal data track pitch as shown in FIG. 5C. That is when the data tracks are rewritten, the head bar 22 is tilted at the nominal angle as shown in FIG. 5C in order to rewrite the data tracks at the nominal data track pitch.

A distortion of the magnetic tape (e.g., contraction or expansion) may be detected in any suitable manner. Referring again to FIG. 5B, in one embodiment the head bar 22 may comprise servo read heads (not shown) at each end of the head bar 22 configured to read dedicated servo tracks (e.g., comprising conventional servo stripes). In one embodiment, the servo position information generated from reading the dedicated servo tracks provides an indication of magnetic tape distortion, such as an expansion of the magnetic tape shown in FIG. 5B. In one embodiment, when the head bar is tilted back to the nominal tilt angle as shown in FIG. 5C, the servo read heads are still able to read the dedicated servo tracks due, for example, to the lateral width of the servo tracks being sufficiently high, or by using secondary servo read heads spaced apart laterally from primary read heads. In yet another embodiment, the magnetic tape may be servo written with embedded servo data that spans the data band shown in FIG. 5B which may be read by the data read heads of the head bar 22 in order to generate the servo position information. In this embodiment, the embedded servo data may define a plurality of servo tracks at a first servo track pitch wherein the data track pitch of the data tracks may be defined relative to the servo tracks. That is, the width of the data tracks may vary relative to the width of the servo tracks in order to compensate for a contraction or expansion of the magnetic tape over time.

Figure 6A:
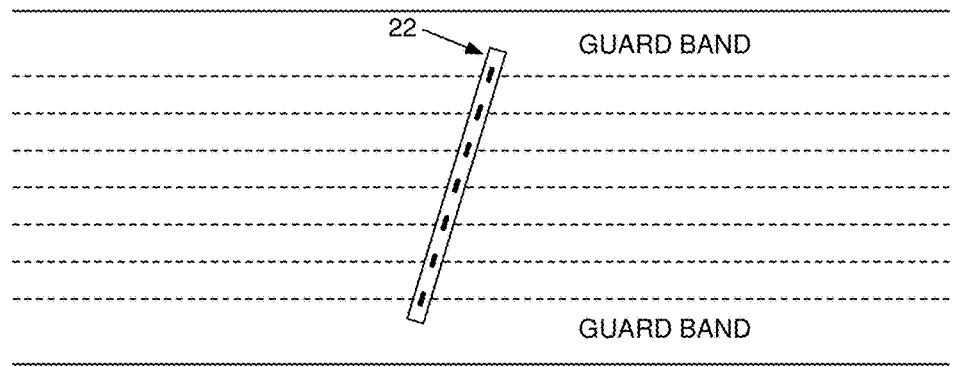
FIG. 6A shows an embodiment wherein the head bar is tilted at a nominal angle when writing data tracks at the nominal data track pitch to an undistorted area of the magnetic tape comprising at least one guard band.
Figure 6B:
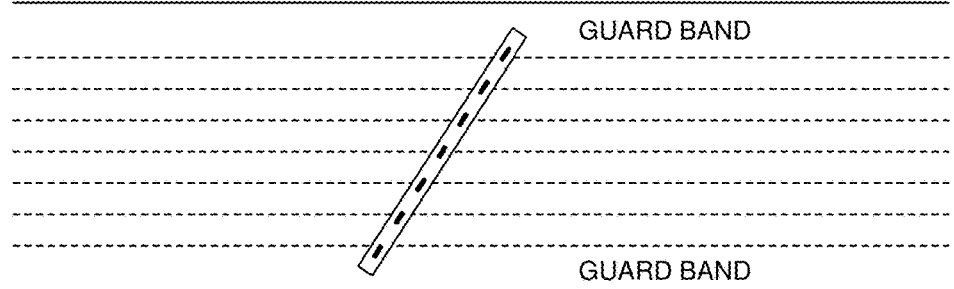
FIG. 6B shows an embodiment wherein an excessive contraction of the magnetic tape may prevent the head bar from accessing the data tracks due to the decrease in the data track pitch.
Figure 6C:
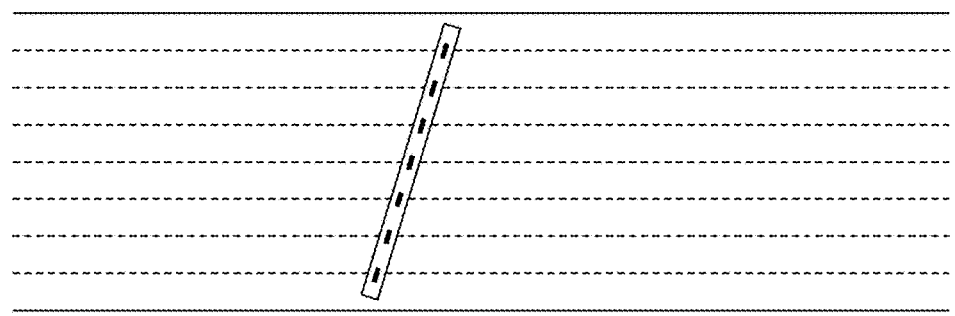
FIG. 6C shows an embodiment wherein when contraction of the magnetic tape is detected, the data tracks are rewritten at the nominal data track pitch by tilting the head bar at the nominal angle.

FIG. 6A shows an embodiment wherein when writing a band of data tracks to an undistorted area of the magnetic tape, the data track pitch is defined so as to reserve at least one guard band at an outer boundary of the data tracks. When the tilt angle of the head bar 22 exceeds a threshold such as shown in FIG. 6B due to the magnetic tape contracting, the data tracks are rewritten (with the old or new data) at the nominal track pitch by tilting the head bar to the nominal angle. As shown in the embodiment of FIG. 6C, rewriting the data tracks after the magnetic tape has contracted results in the outer data tracks of the data band extending into the guard band(s).

Figure 7A:
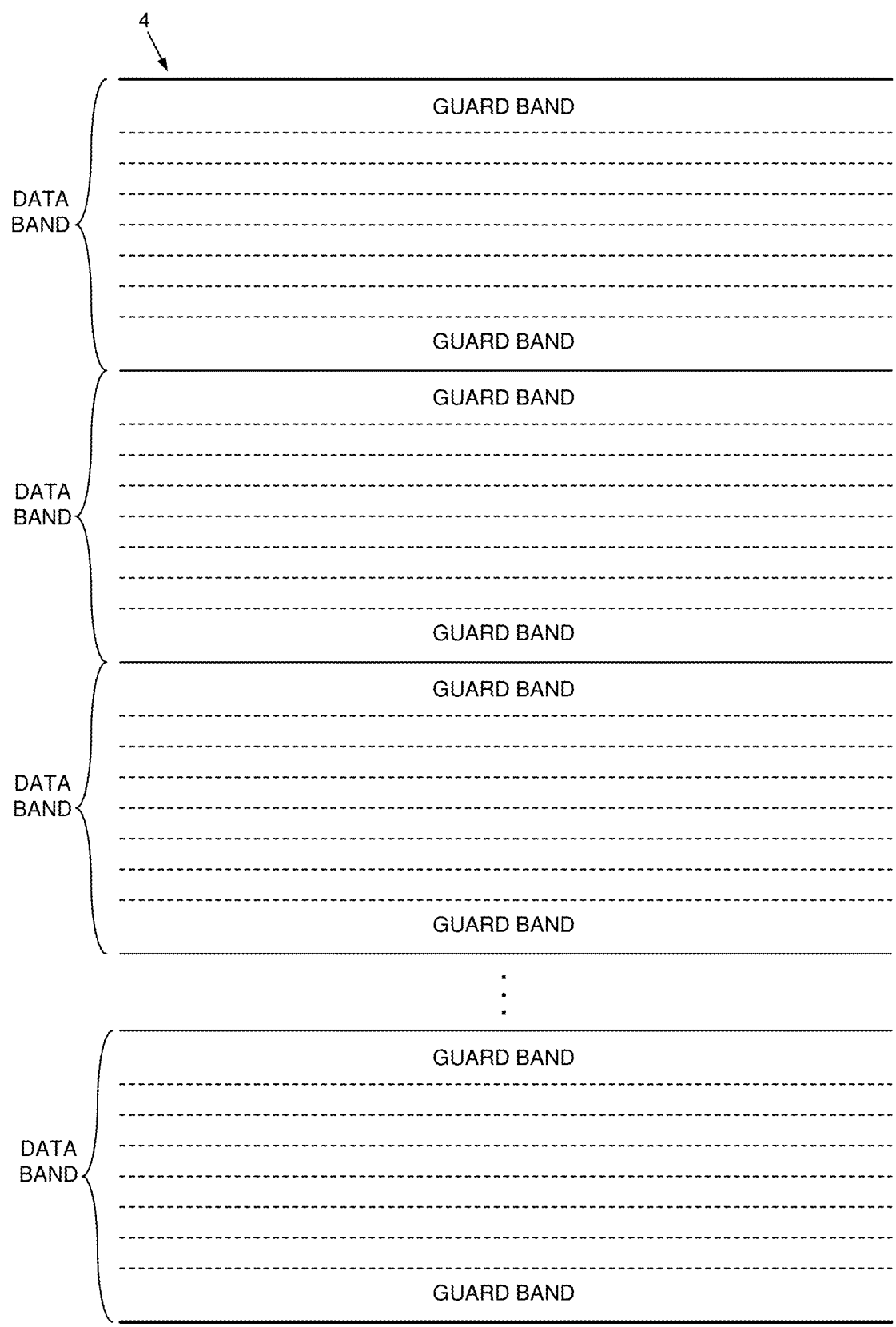
FIG. 7A shows an embodiment wherein a plurality of data bands are defined on the magnetic tape, wherein each data band comprises at least one guard band used to compensate for the magnetic tape contracting.

FIG. 7A shows an embodiment wherein a plurality of data bands may be defined across the lateral width of the magnetic tape, wherein each data band comprises at least one guard band at the outer boundary of the data tracks when the data tracks are written to an undistorted magnetic tape. In this embodiment, the guard bands facilitate increasing the data track pitch of the data bands when the magnetic tape contracts while avoiding an overlap of the data bands as the data tracks expand outward.

Figure 7B:
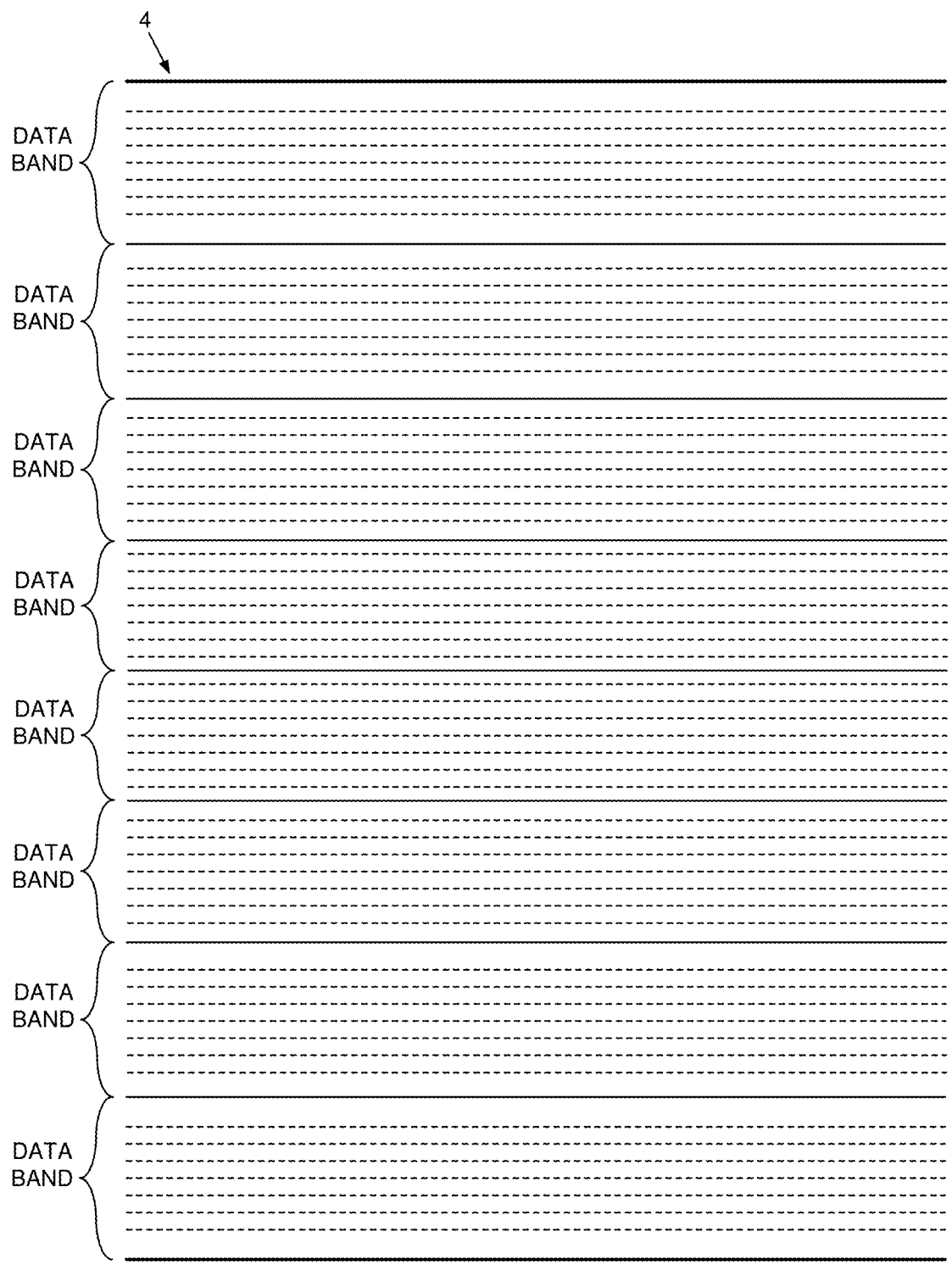
FIG. 7B shows an embodiment wherein a width of a guard band defined within each of a plurality of data bands increases toward the outer edges of the magnetic tape to account for an increase in distortion toward the outer edges.

FIG. 7B shows an embodiment wherein the width of the guard band(s) at the outer boundary of each data band increases toward the outer edges of the magnetic tape in order to increase the format efficiency. In this embodiment, the increasing data track pitch due to a distortion of the magnetic tape (e.g., contraction or expansion) may be more pronounced toward the outer edges of the magnetic tape, thereby requiring larger guard bands to compensate for the distortion when the data tracks are rewritten. Conversely the less pronounced effect of tape distortion toward the middle of the tape means smaller guard band(s) may be defined near the middle of the tape, thereby increasing the storage capacity.

In some embodiments, the data tracks of each data band such as shown in FIGS. 7A and 7B may be written in a single pass by respective heads of the head bar 22. In another embodiment, multiple data tracks may be written using each head of the head bar 22 by incrementally adjusting the lateral position of the head bar 22 over the data band. In one embodiment, the incrementally written data tracks may be shingle written meaning that a currently written data track may at least partially overlap a previously written data track. In one embodiment, when rewriting data tracks at the nominal data track pitch after detecting a distortion of the magnetic tape, all of the data within a predetermined longitudinal segment and within a predetermined data band may be read and then rewritten to the same area of the magnetic tape, to a different area of the magnetic tape, or to a different magnetic tape. When the previously written data is rewritten from a first area to a second area of the magnetic tape (or to a different magnetic tape), the first area may be considered "erased" such that new data may be written to the first area at the nominal data track pitch as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a first magnetic tape, the data storage device comprising:
    at least one head configured to access the first magnetic tape; and
    control circuitry configured to:
        write user data to a first area of the first magnetic tape at a first data track pitch;
        detect a distortion of the first magnetic tape; and
        when the distortion of the first magnetic tape is detected, rewrite the user data to compensate for the distortion.

2. The data storage device as recited in claim 1, wherein:
    the first magnetic tape is housed in a cartridge assembly; and
    the data storage device comprises a tape drive assembly configured to receive the cartridge assembly.

3. The data storage device as recited in claim 1, wherein the first magnetic tape expanding causes the distortion.

4. The data storage device as recited in claim 1, wherein the first magnetic tape contracting causes the distortion.

5. The data storage device as recited in claim 1, wherein when the distortion is detected, the control circuitry is further configured to rewrite the user data to the first area of the first magnetic tape.

6. The data storage device as recited in claim 1, wherein when the distortion is detected, the control circuitry is further configured to rewrite the user data to a second area of the first magnetic tape.

7. The data storage device as recited in claim 1, wherein when the distortion is detected, the control circuitry is further configured to rewrite the user data to a second magnetic tape different from the first magnetic tape.

8. The data storage device as recited in claim 1, wherein:
    the distortion causes a change in the first data track pitch; and
    when the distortion is detected, the control circuitry is further configured to rewrite the user data at the first data track pitch.

9. The data storage device as recited in claim 8, further comprising a head bar comprising the head, wherein when the distortion is detected, the control circuitry is further configured to:
   tilt the head bar by a first angle to read the user data from the first area of the first magnetic tape; and
   tilt the head bar by a second angle different from the first angle to rewrite the user data at the first data track pitch.

10. The data storage device as recited in claim 9, wherein when the distortion is detected, the control circuitry is further configured to rewrite the user data to the first area of the first magnetic tape at the first data track pitch.

11. The data storage device as recited in claim 10, wherein the first area of the first magnetic tape comprises at least one guard band to facilitate rewriting the user data at the first data track pitch when the first magnetic tape contracts.

12. A data storage device configured to access a first magnetic tape, the data storage device comprising:
   a head bar comprising a plurality of heads configured to access a plurality of data tracks on the first magnetic tape; and
   control circuitry configured to:
      write first user data to a first area of the first magnetic tape at a first data track pitch; and
      when the first magnetic tape contracts causing a decrease in the first data track pitch of the first user data, write second user data to the first area of the first magnetic tape at the first data track pitch, wherein the first area of the first magnetic tape comprises at least one guard band to facilitate writing the second user data at the first data track pitch.

13. The data storage device as recited in claim 12, wherein:
   the first magnetic tape is housed in a cartridge assembly; and
   the data storage device comprises a tape drive assembly configured to receive the cartridge assembly.

14. The data storage device as recited in claim 12, wherein the second user data is the same as the first user data such that writing the second user data rewrites the first user data to the first area of the first magnetic tape.

15. The data storage device as recited in claim 12, wherein the first magnetic tape comprises a plurality of data bands each comprising at least one guard band.

16. The data storage device as recited in claim 12, wherein when the contraction is detected, the control circuitry is further configured to rewrite the first user data to a second area of the first magnetic tape at the first data track pitch, wherein the second area of the first magnetic tape comprises at least one guard band to facilitate rewriting the first user data at the first data track pitch.

17. The data storage device as recited in claim 16, wherein when the contraction is detected, the control circuitry is further configured to:
   tilt the head bar by a first angle to read the first user data from the first area of the first magnetic tape; and
   tilt the head bar by a second angle different from the first angle to rewrite the first user data at the first data track pitch.

18. The data storage device as recited in claim 17, wherein when the contraction is detected, the control circuitry is further configured to rewrite the first user data to the first area of the first magnetic tape at the first data track pitch.

19. A data storage device configured to access a first magnetic tape, the data storage device comprising:
   at least one head configured to access the first magnetic tape;
   a means for writing user data to a first area of the first magnetic tape at a first data track pitch;
   a means for detecting a distortion of the first magnetic tape; and
   when the distortion is detected, a means for rewriting the user data to compensate for the distortion.

* * * * *